US009203575B2

(12) United States Patent
Jia et al.

(10) Patent No.: US 9,203,575 B2
(45) Date of Patent: Dec. 1, 2015

(54) WIRELESS COMMUNICATION SYSTEM, BASE STATION, AND WIRELESS COMMUNICATION METHOD

(75) Inventors: Yunjian Jia, Chongqing (CN); Kenzaburo Fujishima, Yokohama (JP)

(73) Assignee: HITACHI, LTD., Tokyo (JP)

( * ) Notice: Subject to any disclaimer, the term of this patent is extended or adjusted under 35 U.S.C. 154(b) by 291 days.

(21) Appl. No.: 13/882,648

(22) PCT Filed: Oct. 27, 2011

(86) PCT No.: PCT/JP2011/074845
§ 371 (c)(1),
(2), (4) Date: Jul. 19, 2013

(87) PCT Pub. No.: WO2012/060279
PCT Pub. Date: May 10, 2012

(65) Prior Publication Data
US 2013/0331110 A1  Dec. 12, 2013

(30) Foreign Application Priority Data

Nov. 5, 2010  (JP) .................................. 2010-248669

(51) Int. Cl.
*H04L 5/00* (2006.01)
*H04W 28/06* (2009.01)
(Continued)

(52) U.S. Cl.
CPC .............. *H04L 5/0035* (2013.01); *H04L 5/006* (2013.01); *H04L 5/0069* (2013.01);
(Continued)

(58) Field of Classification Search
CPC ... H04L 5/0035; H04L 5/0094; H04L 5/0069; H04L 5/006; H04L 5/0023; H04W 72/0453; H04W 72/042; H04W 88/08; H04W 72/0413; H04W 28/06
See application file for complete search history.

(56) References Cited

U.S. PATENT DOCUMENTS

2007/0263576 A1   11/2007  Deguchi
2009/0129259 A1*   5/2009  Malladi et al. ................ 370/210
(Continued)

FOREIGN PATENT DOCUMENTS

JP    2007-189619 A    7/2007
JP    2010-045783 A    2/2010
(Continued)

OTHER PUBLICATIONS

IEEE Standards Association, "IEEE Standard for Local and metropolitan area networks-Part 16: Air Interface for Broadband Wireless Access Systems Amendment 3: Advanced Air Interface", New York, USA, May 6, 2011.
(Continued)

*Primary Examiner* — Dinh P Nguyen
(74) *Attorney, Agent, or Firm* — Volpe and Koenig, P.C.

(57) ABSTRACT

A base station performs an association between frequency range and combinations of a plurality of base stations including an local base station to notify a terminal of the association. According to the notified association, the terminal, for each frequency, calculates quality of communication with one base station or quality of communication with the combination of the plurality of base stations. The base station and the control station determine the base station/the plurality of base stations that communicate with the terminal, the wireless resource and the transmission scheme, based on the result. Further, the base station selects whether to notify an entirety of or a part of the association to the terminal using positional information of the terminal. Since the association information that is unnecessary for the terminal is not communicated, it is possible to further lighten the load of control.

17 Claims, 17 Drawing Sheets

(51) Int. Cl.
*H04W 72/04* (2009.01)
*H04W 88/08* (2009.01)

(52) U.S. Cl.
CPC ............ *H04L 5/0094* (2013.01); *H04W 28/06* (2013.01); *H04L 5/0023* (2013.01); *H04W 72/042* (2013.01); *H04W 72/0413* (2013.01); *H04W 72/0453* (2013.01); *H04W 88/08* (2013.01)

(56) References Cited

U.S. PATENT DOCUMENTS

| | | | |
|---|---|---|---|
| 2009/0247181 A1* | 10/2009 | Palanki et al. | 455/452.2 |
| 2009/0264142 A1* | 10/2009 | Sankar et al. | 455/501 |
| 2009/0310558 A1 | 12/2009 | Koyanagi | |
| 2011/0255526 A1* | 10/2011 | Kaneko et al. | 370/338 |

FOREIGN PATENT DOCUMENTS

| | | | | |
|---|---|---|---|---|
| JP | 2010-199910 A | 9/2010 | | |
| WO | 2008105091 A1 | 9/2008 | | |
| WO | 2010/032791 A1 | 3/2010 | | |
| WO | WO 2010/073676 | * 7/2010 | ............ | H04W 92/20 |
| WO | 2010/103728 A1 | 9/2010 | | |

OTHER PUBLICATIONS

3rd Generation Partnership Project, Tecnical Specification Group Radio Access Network; Evolved Universal Terrestrial Radio Access (E-UTRA); Further advancements for E-UTRA physical layer aspects (Release 9), 3GPP TR 36.814 V9.0.0, Mar. 2010.

* cited by examiner

DIAGRAM ILLUSTRATING EXAMPLE OF COMMON POWER PROFILE BY OAM CONTROL RELATING TO EMBODIMENT OF PRESENT INVENTION

EXPLANATORY DIAGRAM OF CONTROL SIGNAL FORMAT
RELATING TO EMBODIMENT OF PRESENT INVENTION (a) CONTROL STATION → BASE STATION: BANDWIDTH TRANSMISSION POWER PROFILE ADJUSTMENT COMMAND

| NOTIFICATION DESTINATION FIRST INFORMATION (BASE STATION ID, ANTENNA ID, AND OTHERS) | ADJUSTMENT BANDWIDTH NUMBER #1 | ADJUSTMENT VALUES | ADJUSTMENT BANDWIDTH NUMBER #2 | ADJUSTMENT VALUES |
|---|---|---|---|---|
| NOTIFICATION DESTINATION SECOND INFORMATION (BASE STATION ID, ANTENNA ID, AND OTHERS) | ADJUSTMENT BANDWIDTH NUMBER #1 | ADJUSTMENT VALUES | ADJUSTMENT BANDWIDTH NUMBER #2 | ADJUSTMENT VALUES |
| NOTIFICATION DESTINATION THIRD INFORMATION (BASE STATION ID, ANTENNA ID, AND OTHERS) | ADJUSTMENT BANDWIDTH NUMBER #1 | ADJUSTMENT VALUES | ADJUSTMENT BANDWIDTH NUMBER #2 | ADJUSTMENT VALUES |

(b) CONTROL STATION → BASE STATION: ASSOCIATION BETWEEN BASE STATION AND BANDWIDTH, AND CONTROL INFORMATION

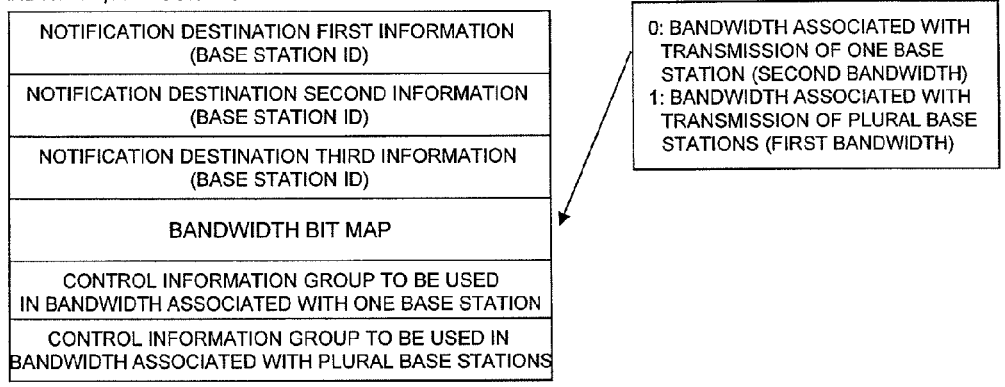

FIG. 8

EXPLANATORY DIAGRAM OF CONTROL SIGNAL FORMAT
RELATING TO EMBODIMENT OF PRESENT INVENTION (a) CONTROL STATION → BASE STATION: REQUEST FOR COOPERATIVE PROCESS OF TERMINALS

| INFORMATION OF BASE STATION TO WHICH TERMINAL BELONGS (BASE STATION ID) |
|---|
| TERMINAL INFORMATION (TERMINAL ID) |
| NUMBER OF BANDWIDTH IN WHICH BASE STATION IS ASSOCIATED WITH PLURAL BASE STATION TRANSMISSION |
| ANOTHER BASE STATION FIRST INFORMATION TO BE USED IN ABOVE BANDWIDTH (BASE STATION ID) |
| ANOTHER BASE STATION SECOND INFORMATION TO BE USED IN ABOVE BANDWIDTH (BASE STATION ID) |

(b) BASE STATION → TERMINAL: ASSOCIATION INFORMATION TO TERMINAL

| LOCAL BASE STATION INFORMATION (BASE STATION ID, ANTENNA ID) |
|---|
| Serving BANDWIDTH NUMBER |
| LOCAL BASE STATION BANDWIDTH ASSOCIATION SUB BAND BIT MAP |
| REFERENCE SIGNAL FOR ABOVE SUB BAND |
| PLURAL BASE STATION BANDWIDTH ASSOCIATION SUB BAND BIT MAP |
| ABOVE ASSOCIATED BASE STATION INFORMATION |
| REFERENCE SIGNAL FOR ABOVE SUB BAND |

FIG. 9

EXPLANATORY DIAGRAM OF CONTROL SIGNAL FORMAT
RELATING TO EMBODIMENT OF PRESENT INVENTION (a) TERMINAL → BASE STATION: CHANNEL INFORMATION AND CQI INFORMATION

| |
|---|
| SUB BAND BIT MAP ASSOCIATED WITH LOCAL BASE STATION TRANSMISSION |
| INFORMATION OF CHANNEL WITH LOCAL BASE STATION IN ABOVE SUB BAND |
| COMMUNICATION SCHEME CANDIDATE (SISO, MIMO, AND OTHERS) AND COMMUNICATION QUALITY WITH LOCAL BASE STATION IN ABOVE SUB BAND |
| SUB BAND BIT MAP ASSOCIATED WITH PLURAL BASE STATION TRANSMISSION |
| INFORMATION OF CHANNEL OF BASE STATION 1 IN ABOVE SUB BAND |
| INFORMATION OF CHANNEL OF BASE STATION 2 IN ABOVE SUB BAND |
| INFORMATION OF CHANNEL OF BASE STATION 3 IN ABOVE SUB BAND |
| COMMUNICATION SCHEME CANDIDATE (MIMO, AND OTHERS) AND COMMUNICATION QUALITY WITH BASE STATION GROUP IN ABOVE SUB BAND |

(b) BASE STATION → TERMINAL: SCHEDULING INFORMATION AND COMMUNICATION SCHEME INFORMATION

| |
|---|
| SCHEDULING INFORMATION (SUB BAND FOR COMMUNICATION, MCS, AND OTHERS) |
| BASE STATION INFORMATION ASSOCIATED WITH SUB BAND FOR COMMUNICATION (BASE STATION ID, ANTENNA PORT) |
| COMMUNICATION PROCESSING SCHEME INFORMATION (SU-MIMO, MU-MIMO, AND OTHERS) |
| RECEPTION PROCESSING INFORMATION (RECEPTION BEAM FORMING INFORMATION, REFERENCE SIGNAL FOR MODULATION, AND OTHERS) |

FIG. 10

WIRELESS COMMUNICATION SYSTEM, BASE STATION, AND WIRELESS COMMUNICATION METHOD

TECHNICAL FIELD

The present invention relates to a wireless communication system, a base station and a wireless communication method, particularly to a communication scheme in wireless communication and a communication device for realizing the scheme. More specifically, the present invention relates to a method of performing transmission and reception between a terminal belonging to each base station and its local base station or a plurality of base stations, and a control station and a wireless communication device that are used therein.

BACKGROUND ART

In a wireless communication system, in which an area to which wireless communication services are provided is divided into a plurality of zones (cells) around the base station, and which is configured of each base station and a plurality of terminals present in a cell that the base station covers, an interference problem that occurred in a boundary area (cell edge) of the cell has attracted attention. In a terminal in the cell edge, a distance difference between a distance from a base station in its local cell and a distance from a base station in an adjacent cell is small and reception powers of a desired signal reached from the local base station and an interference signal reached from the adjacent base station are similar, so a signal-to-interference power ratio is low and a communication rate or communication quality is degraded.

In order to solve the interference problem in the cell edge, various methods have been studied. These methods are roughly classified into two methods, that is, a method of avoiding interference and a method of using interference.

As the method of avoiding interference, Fractional Frequency Reuse (FFR) is typical. As described in PTL1, in this method, an local cell and an adjacent cell use different frequency ranges in a cell edge, so a desired signal received from an local base station and an interference signal reached from an adjacent base station are orthogonal in a frequency domain in a terminal in the cell edge, and thus it is possible to avoid interference. As described in NPL1, this method is considered for WiMAX that IEEE promotes standardization.

Meanwhile, as the method of using interference, an inter-base station cooperative transmission is one of typical methods. A plurality of base stations cooperate through a control station, and a transmission signal addressed to a terminal in a cell edge is simultaneously transmitted to the terminal not only from its local base station but also from a plurality of base stations, thereby it is possible to change a wave that was interference in the related art into a desired signal. As described in NPL2, with this method, standardization has been considered for long term evolution (LTE)-advanced by the 3rd generation partnership project (3GPP).

In the above two interference methods, differently from FFR, the inter-base station cooperative transmission transmits a desired signal of a terminal from a plurality of base stations including the local base station, thereby increasing reception power of the desired signal, while reducing interference. Therefore, it is expected that the inter-base station cooperative transmission can further improve the communication rate or the communication quality of the cell edge than FFR, and thus the inter-base station cooperative transmission attracts attention.

CITATION LIST

Patent Literature

[PTL1] JP-A-2007-189619

Non Patent Literature

[NPL1] IEEE Std 802.16m-2009
[NPL2] 3GPP ($3^{rd}$ Generation Partnership Project) TR_36.814_041: Technical Specification Group Radio Access Network: Further Advancements for E-UTRA, Physical Layer Aspects

SUMMARY OF INVENTION

Technical Problem

In a wireless communication system using an inter-base station cooperative transmission, there is no disclosure about whether a terminal in a cell edge and terminals other than the terminal in the cell edge perform one-to-one communication with a local base station or perform cooperative transmission with a plurality of base stations, nor about a determination procedure of a communication scheme according thereto.

Further, since the inter-base station cooperative transmission performed in the terminal in the cell edge gives an influence to the terminal in a cell center not subjected to impact in the related art, this may ensure the communication rate and the communication quality of the terminal in the cell edge, but may degrade the communication rate or the communication quality of the terminal in the cell center. A method to solve this problem is not disclosed.

Further, in the system that does not perform the cooperative transmission in the related art, the base station in the cell to which the terminal belongs determines wireless resource allocation to the terminal according to the status of the local cell. However, in the system using the inter-base station cooperative transmission, a plurality of base stations other than the local base station determine wireless resource allocation to the terminal. There is no disclosure about a procedure of determining which base stations are to be combined for each frequency, which wireless resources are to be allocated to each terminal according to the combination, and which communication scheme is to be performed.

Therefore, in the system using the inter-base station cooperative transmission, a terminal needs a communication procedure and a control method of determining which base station or which combination of base stations is to be used and which wireless resource and which transmission scheme are to be used for communication. Then, with the increase in the number of terminals, frequency range, and the number of base stations that cooperate, there is a problem in that the processing amount for performing determination increases and also the burden of the terminal, the base station and the control station increases.

In view of the above problems, an object of the present invention is to lighten the processing load of the terminal, the base station and the control station in a wireless system using inter-base station cooperative transmission in order to determine wireless resource allocation to the terminal and a transmission scheme.

Solution to Problem

To solve the problems, in the present invention, a base station associates a combination of a plurality of base stations including an local base station with frequency ranges and notifies a terminal of the association, and a terminal calculates, for each frequency, quality of communication with one base station or quality of communication with the combination of the plurality of base stations according to the notified association. The base station and the control station determine a base station/a plurality of base stations that perform communication with a terminal, wireless resources and transmission schemes based on the result.

Further, the base station selects whether to notify the terminal of an entire or a part of the association, using positional information of the terminal. More association information than necessary is not notified to the terminal, thereby lightening the load of control and processing.

Furthermore, association that all base stations can use commonly is performed.

According to the first solving means of the present invention, there is provided a wireless communication system comprising:

a plurality of base stations;

a terminal that wirelessly communicates with the base stations based on a result of channel estimation and communication quality estimation with the base station; and a control station that determines association information in which a first frequency range used in a cooperative transmission by the plurality of base stations and a second frequency range used in single transmission by one base station are specified, and notifies the plurality of base stations of the association information, wherein the base station includes:

a transmission unit that performs the cooperative transmission to the terminal by the plurality of base stations and performs single transmission to the terminal from the local base station; and an association processing unit that notifies the terminal of association information notified from the control station, the terminal specifies a corresponding frequency range, according to whether to perform communication with the base station by the cooperative transmission from the base station or to perform communication with the base station by single transmission from the base station, based on association information received from the base station, and performs channel estimation and communication quality estimation in the frequency range.

According to the second solving means of the present invention, there is provided a base station in a wireless communication system which includes a plurality of base stations, a terminal that wirelessly communicates with the base stations based on a result of channel estimation and communication quality estimation with the base station, and a control station, the base station comprising:

a transmission unit that performs a cooperative transmission to the terminal by the plurality of base stations and a single transmission from the local base station to the terminal; and an association processing unit that receives from the control station, association information in which a first frequency range used in the cooperative transmission by the plurality of base stations and a second frequency range used in the single transmission by one of the base stations are specified, and notifies the terminal of the association information;

wherein the base station receives result of channel estimation and communication quality estimation performed in a corresponding frequency range, according to whether the terminal communicates with the base station by the cooperative transmission from the base stations or to communicate with the base station by the single transmission from the base station, based on the association information, and the base station determines a communication scheduling and a communication scheme with the terminal using the result of the channel estimation and the communication quality estimation, or receives a communication scheduling and a communication scheme with the terminal determined by the control station using the result of the channel estimation and the communication quality estimation, and communicates with the terminal by the scheduling and the communication scheme.

According to the third solving means of the present invention, there is provided a wireless communication method in a wireless communication system which includes a plurality of base stations, a terminal that wirelessly communicates with the base stations based on a result of channel estimation and communication quality estimation with the base station, and a control station, the wireless communication method including steps of:

the control station determining association information in which a first frequency range used in the cooperative transmission by the plurality of base stations and a second frequency range used in the single transmission by one of the base stations are specified, and notifying the plurality of base stations of the association information;

each base station notifying the terminal of association information which is notified from the control station; and the terminal specifying a corresponding frequency range, according to whether the terminal communicates with the base station by the cooperative transmission from the base stations or to communicate with the base station by the single transmission from the base station, based on the association information received from the base station, and performing channel estimation and communication quality estimation in the frequency range.

Advantageous Effects

It is possible, according to the present invention, to lighten the processing load of the terminal, the base station and the control station in a wireless system using inter-base station cooperative transmission in order to determine wireless resource allocation to the terminal and a transmission scheme.

BRIEF DESCRIPTION OF DRAWINGS

FIG. 8 is an explanatory diagram (1) of a control signal format relating to the embodiment of the present invention.

FIG. 9 is an explanatory diagram (2) of a control signal format relating to the embodiment of the present invention.

FIG. 10 is an explanatory diagram (3) of a control signal format relating to the embodiment of the present invention.

DESCRIPTION OF EMBODIMENTS

Hereinafter, a wireless communication system, a wireless communication device, and a wireless communication method relating to embodiments of the present invention will be described in detail referring to figures.

(Embodiment 1)

A first embodiment of the present invention will be described referring to FIGS. 1 to 15.

Figure 1:
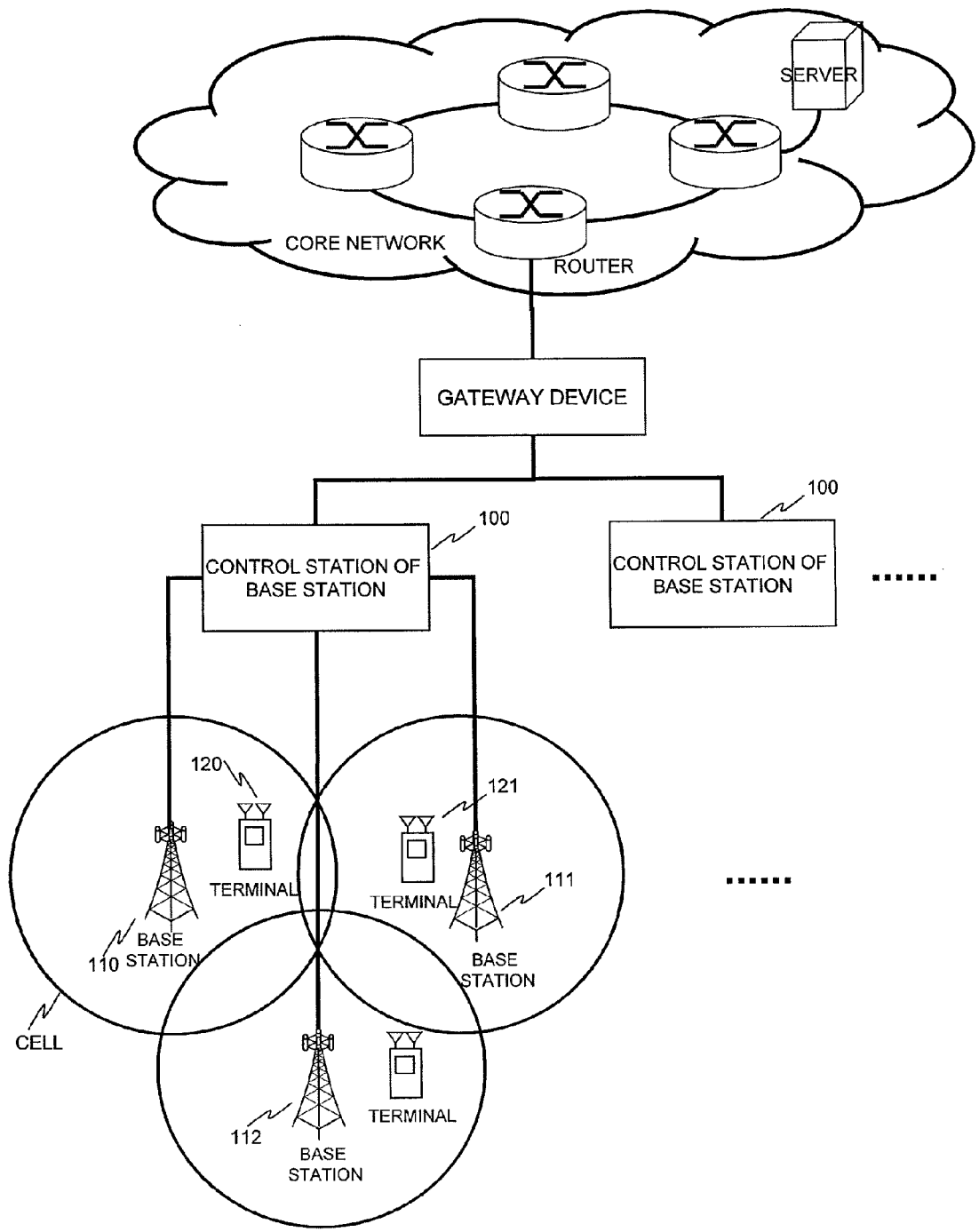
FIG. 1 is a diagram illustrating a configuration of a cellular system in a first example of the present invention.

FIG. 1 is a diagram illustrating a configuration of a cellular system, or a mobile communication system, or a portable telephone system assumed in this embodiment. A core network connected to a server which provides service content, and the like is connected to Radio Access Network by a gateway. The gateway is connected to a plurality of base station control stations 100, each base station control station 100 is connected to a plurality of base stations 110 to 112, and the base stations 110 to 112 realize the provision of services to the wireless terminals 120 and 121 by transmission and reception of wireless signals. An area to which a wireless service is provided is divided into a plurality of cells, and one base station is provided for each cell, and thus wireless communication with terminals is performed within its local cell.

First, an interference problem in the edge of each cell in a cellular system will be described. A base station 110 and a base station 111 transmit a radio wave in order to respectively cover a cell 110 and a cell 111. Between the two cells (cell edge), a distance to the local-cell base station is long, so the reception power of a desired signal of the terminal is low due to an attenuation of a radio wave. Meanwhile, a distance to the base station in an adjacent cell is shorter in the cell edge compared to the cell center, so a radio wave from the base station in the adjacent cell arrives there to become interference. That is, compared to the terminal in the cell center, in the terminal in the cell edge, the power of the desired signal received from the local-cell base station is reduced, whereas the interference of power of an interference signal received from an other-cell base station is increased. Therefore, the signal-to-interference power ratio of the desired signal is degraded, and the communication rate and the communication quality are deteriorated. In this case, the communication capacity of a terminal 121 in the edge of the cell 110 is represented by Equation (1).

[Equation 1]

$$C = W_1 \log\left(1 + \frac{P_1 * L_1}{P_2 * L_2 + N_1}\right) \quad (1)$$

Here, C is a communication capacity of the terminal 121 in the cell edge of the system in the related art. W1 is a frequency range allocated to the terminal, P1 is transmission power of the base station 110, L1 is a factor indicating a ratio of reception power to transmission power, caused by a loss of a wave attenuation, and the like when a transmission signal from the base station 110 reaches the terminal 121. P2 is transmission power of the adjacent base station 111, and L2 is a factor indicating a ratio of reception power to transmission power, caused by a loss of a wave attenuation, and the like when a transmission signal from the base station 111 reaches the terminal 121. N1 is received noise power of the terminal 121.

On the other hand, in FFR which avoids an interference signal from another cell, since a signal which reaches the cell edge from the base stations in the cell uses a different bandwidth, signals in the cell edge do not become interference to each other. That is, the bandwidth of a signal transmitted from the base station 110 to the terminal 121 is different from the bandwidth of a signal transmitted from the base station 111 to the cell edge. In this case, communication capacity of the terminal 121 in the cell edge is represented as Equation (2).

[Equation 2]

$$C_{FFR} = W_1 \log\left(1 + \frac{P_1 * L_1}{N_1}\right) \quad (2)$$

Here, $C_{FFR}$ is communication capacity of the terminal 121 in the cell edge of the system using FFR. By comparing Equation (2) with Equation (1), FFR can avoid interference from another base station and improve communication capacity of the cell edge, but does not improve reception power of the desired signal of the terminal.

As a solution of an interference problem that is different from the above described FFR, in the inter-base station cooperative transmission using an interference signal from another cell, when the terminal in the cell edge receives the desired signal from the base station in the local cell, the adjacent base station also transmits the desired signal of the terminal. Accordingly, the interference reached from the adjacent base station in the related art is converted into the desired signal of the terminal and received. Therefore, the interference no longer exists, and the strength of the desired signal can also be improved. In this case, communication capacity of the terminal in the cell edge is represented as Equation (3).

[Equation 3]

$$C_{CoMP} = W_1 \log\left(1 + \frac{P_1 * L_1 + P_2 * L_2}{N_1}\right) \quad (3)$$

Here, $C_{COMP}$ is communication capacity of the terminal 121 in the cell edge of the system using the inter-base station cooperative transmission. By comparing Equation (3) with Equation (1) and Equation (2), since the inter-base station cooperative transmission solves the interference problem in the cell edge and strengths reception power of the terminal in the cell edge, the communication rate and the communication quality of the cell edge is more excellent than the system using FFR.

However, the inter-base station cooperative transmission improves the communication rate and the communication quality in the cell edge, but has a large influence on the entire system. When the base stations 110 and 111 perform the cooperative transmission of the desired signal of the terminal 121 in the edge of the cell 110, the signal transmitted by the base station 111 also reaches the terminal 120 in the center portion of the cell 111. This signal becomes interference to the terminal 120. That is, it is not considered that the communication state in the terminal in each cell has an impact on the terminal in another cell in the system of the related art, but the impact occurs according to the introduction of the inter-base station cooperative transmission. Therefore, there is a possibility to improve the communication rate and the communication quality of the terminal in the cell edge, but on the contrary, to degrade the communication rate and the communication quality of the terminal within the cell. In addition, each base station performs communication with only the terminal in its local cell in the system of the related art, but performs a cooperative process with a plurality of base stations through a control station by the inter-base station cooperative transmission. The processes of the terminal, the base station and the control station become complicated to cope with these effects.

The present embodiment provides means for simply determining an appropriate transmission scheme in order to solve the problems of the complicated processes of the terminal, the base station and the control station in the system using the inter-base station cooperative transmission. Since a process of determining a transmission scheme is made simpler, it is possible to allocate processing resources to cope with the impact on the system in the cooperative transmission as described above. For example, the base station notifies the terminal of the association between frequencies and a plurality of base stations including the local base station, so the terminal measures an environment of a necessary propagation channel and measures the communication quality, according to the association notified for each frequency. The base station determines the communication scheme with the terminal for each frequency, based on the estimation result. Further, the base station, using other information (for example, positional information of the terminal), may adjust whether to notify the terminal of an entire association or only a part of the association.

Figure 2:
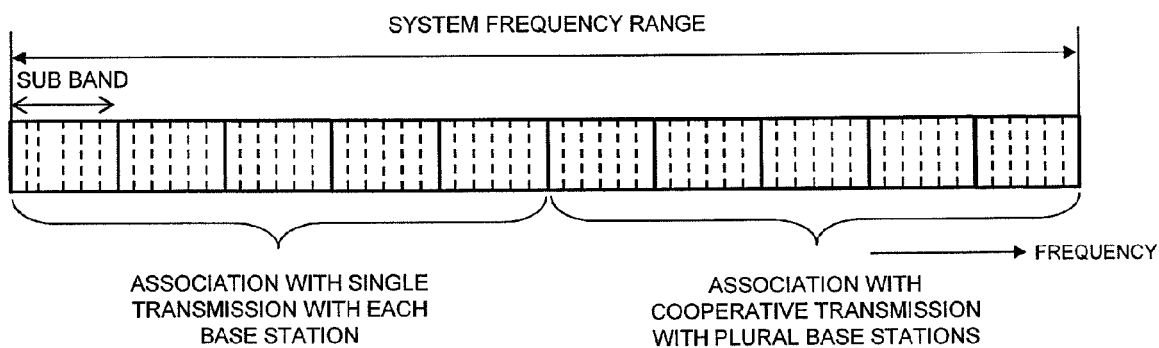
FIG. 2 is a diagram (1) illustrating an example of an association between a base station as an embodiment of the present invention and a frequency range.
Figure 3:
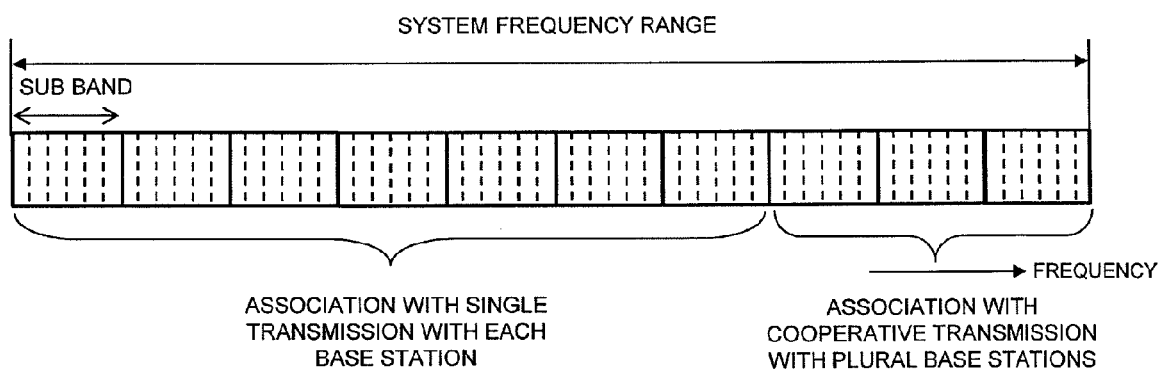
FIG. 3 is a diagram (2) illustrating an example of an association between a base station as the embodiment of the present invention and a frequency range.
Figure 4:
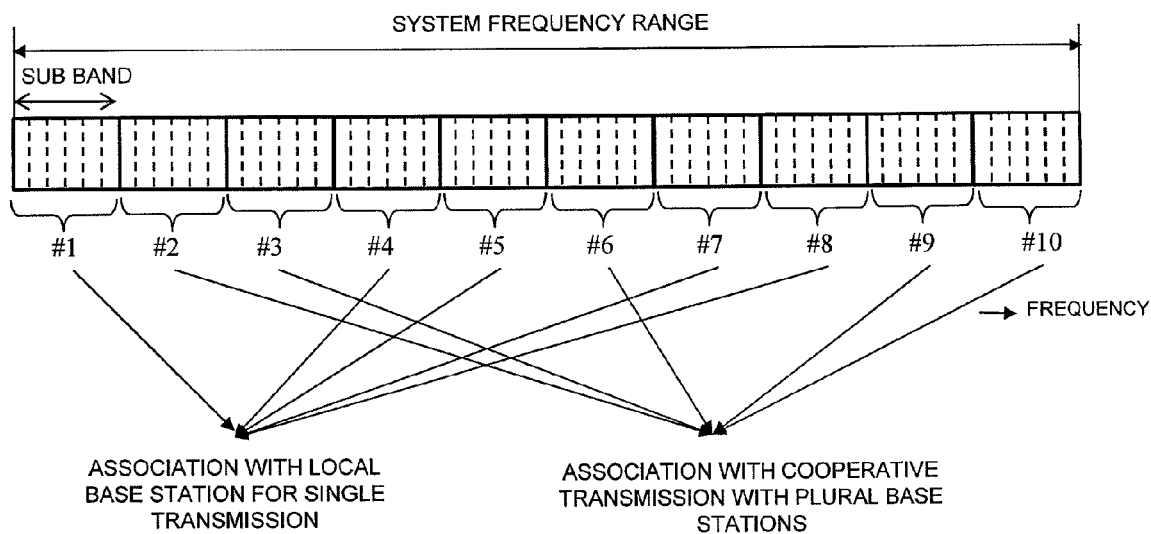
FIG. 4 is a diagram (3) illustrating an example of an association between a base station as the embodiment of the present invention and a frequency range.

FIGS. 2 to 4 show examples of the association.

Each shows an example of a system frequency range. The frequency range used by all systems is configured of a plurality of subcarriers, and a large number of continuous subcarriers form a sub band. FIG. 2 is an example of the association, in which a system bandwidth is divided into two continuous halves, one half is associated with a bandwidth at which communication with the local-cell base station is performed, and the other remaining half is associated with a bandwidth at which communication with a plurality of base stations is performed. FIG. 3 shows another example of the association. Here, FIG. 3 shows that the bandwidth sizes in the association may be different. Further, the bandwidth size in the association (allocation amount) may be changed dynamically. For example, it may be changed depending on a use ratio of the cooperative transmission and a single transmission, or may be changed depending on other appropriate references. FIG. 4 illustrates an example with more degree of freedom of an association. Here, the bandwidth using a similar association is non-continuous.

In the present embodiment, a means for forming the association will be described. That is, the control station installs a power pattern common in the base stations and thus determines frequency range relationship between the local-cell base station communication and a plurality of cell base stations. The control station has an operation and maintenance (OAM) function for the base station, and performs an adjustment and a management of parameters of the base station according to an installation design. In the present embodiment, a transmission power pattern in a system bandwidth of each base station is set using this function.

Figure 5:
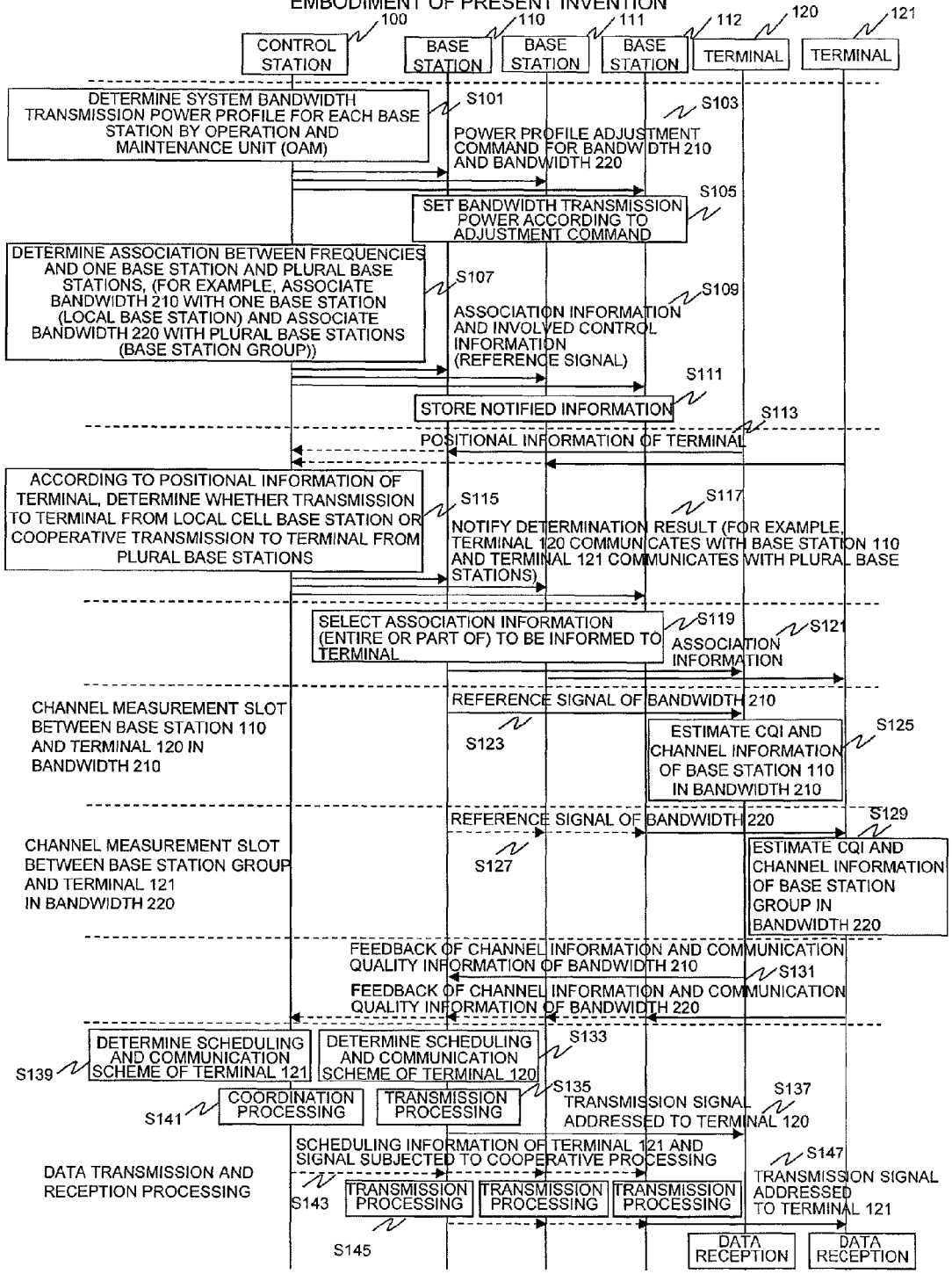
FIG. 5 is a diagram illustrating an example of a control sequence relating to the embodiment of the present invention.

FIG. 5 illustrates an example of a control sequence relating to the embodiment of the present invention.

First, an operation and maintenance unit of the control station 100 determines system bandwidth transmission power profile for each of the base stations 110 to 112 (S101), and notifies each of the base stations 110 to 112 of the transmission power profile adjustment command (S103). The determination process of transmission power profile will be described referring to the flowchart of FIG. 6.

Figure 6:
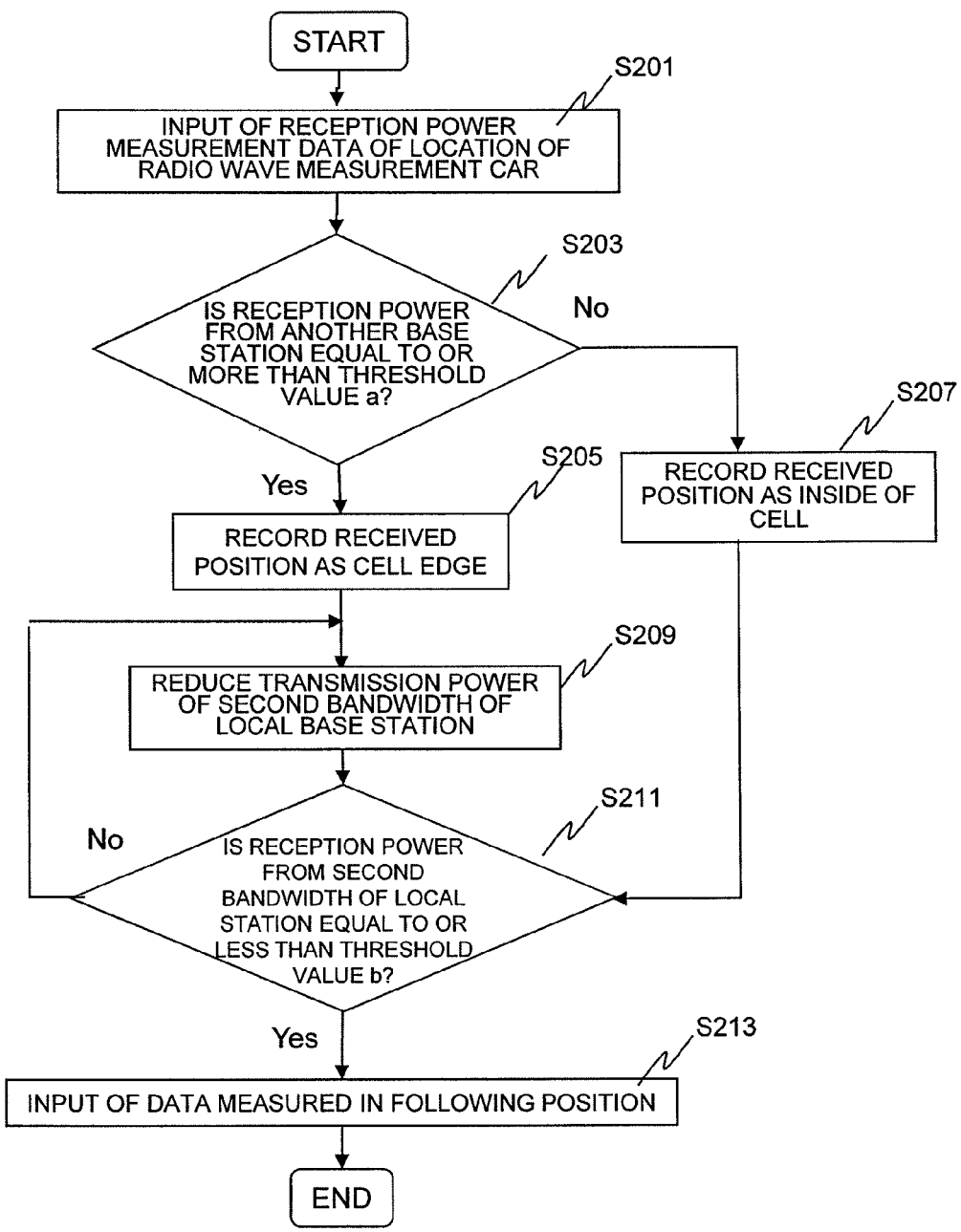
FIG. 6 is a diagram illustrating a control flow chart of OAM relating to the embodiment of the present invention.

FIG. 6 illustrates a control flow of OAM.

At the time of installation design, the control station 100 inputs information regarding a reception signal strength (reception strength data) from each base station in each location that is pre-measured by a radio wave measurement car to the OAM through operation and maintenance input interface (S201). The control station 100, based on this information, determines a power profile of each base station by OAM and gives a command to adjust the transmission power of the base station to the base stations 110 to 112. In the present embodiment, as an example of the transmission power pattern, the system bandwidth is divided into two continuous bandwidths and an association between frequencies used in communication of the local base station and frequencies used in communication with a plurality of base stations is established, and thus the transmission power profile of the base station is determined.

Figure 7:
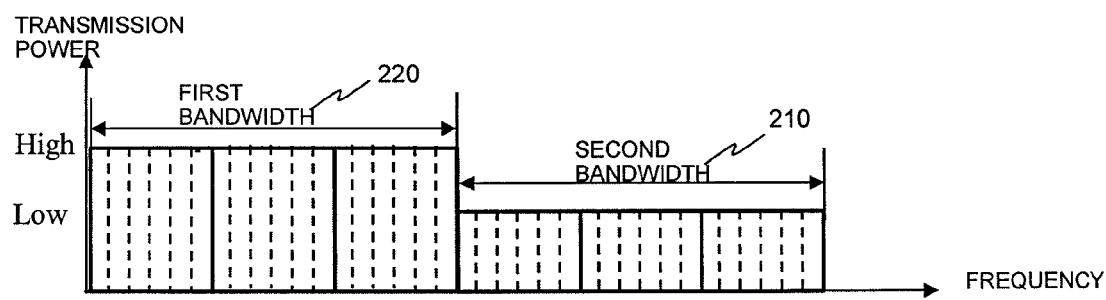
FIG. 7 is a diagram illustrating an example of a common power profile by an OAM control relating to the embodiment of the present invention.

FIG. 7 illustrates an example of the transmission power pattern. As an example, a system bandwidth is divided into two bandwidths, and the transmission power (first transmission power) of a first bandwidth 220 is set to a transmission power value that covers the cell range in the related art. The transmission power (second transmission power) of a second bandwidth 210 is set to be lower than the transmission power of the first bandwidth 220, and to a transmission power value that covers a location which is inside the cell of the local base station and in which a wave strength from other base stations is equal to or less than a threshold value. In this manner, and a bandwidth (for the cooperative transmission) of a high transmission power value and a bandwidth (for the single transmission) of a low transmission power value in which the system bandwidth is divided into two kinds, are common in all base stations.

FIG. 8(a) illustrates an example of a signal format of a transmission power profile that is transmitted from the control station 100 to the base stations 110 to 112. Here, for example, the adjustment bandwidth numbers #1 and #2 are respective identification information for specifying a first bandwidth and a second bandwidth. Further, adjustment values indicate the transmission power (first and second transmission power) of the first bandwidth and the second bandwidth.

Next, the control station 100 determines whether the measurement position is the cell edge or the cell center, based on the received reception strength data from each base station, and stores information indicating whether the measurement position is the cell edge or the cell inside in a memory 406, in association with positional information (S203 to S207). For example, if a predetermined base station is assumed to be a desired base station and the reception power from another base station is equal to or more than the preset threshold value a (S203), the control station 100 records the reception position (measurement position) as the cell edge in the memory 406 (S205), and if the reception power is less than the preset threshold value a (S203), the control station records the reception position (measurement position) as inside the cell in the memory 406 (S207). In a case where it is determined that the measurement position is the cell edge, if the reception power from the second bandwidth 210 of the local station is larger than the preset threshold value b, the control station 100 decreases the transmission power of the second bandwidth 210 of the desired base station (S209 and S211). The control station 100 inputs data measured in the next position and repeats the aforementioned process in steps S203 to S211.

Returning to FIG. 5, the description about the control sequence will be continued. Each of the base stations 110 to 112 sets transmission power for each bandwidth according to the adjustment command (S105). Then, the control station 100 determines the association between frequencies and one base station and a plurality of base stations. In the present embodiment, for convenience of explanation, as an example, it is assumed that the second bandwidth 220 is associated with a transmission (single transmission) by one base station (local base station) and the first bandwidth 210 is associated with a transmission (cooperative transmission) by a plurality of base stations (base station group). The control station 100 notifies each base station of the association information and the control information (reference signal) associated with the association (S109), and each base station stores the notified information (S111). FIG. 8(*b*) illustrates an example of a signal format of the association information transmitted from the control station 100 to the base stations 110 to 112 and the control information (reference signal) involved in each association. For example, as shown in FIG. 8(*b*), the association information can be transmitted in a bandwidth bit map format. For the bandwidth bit map, it is possible to form a bit map in which, for example, for each of the plurality of sub bands, the bandwidth associated with one base station transmission is set to a first bit value (for example, 0), and the bandwidth associated with a plurality of base station transmission is set to a second bit value (for example, 1). Further, the bit map may be set at an appropriate frequency unit other than the sub band unit.

Each of the base stations 110 to 112 aggregates positional information of each of the terminals 120 and 121, and transmits the aggregated positional information of each terminal in the local cell to the control station 100 (S113). The control station 100 determines whether to use the single transmission that performs transmission from one base station to the terminal or to use the cooperative transmission that performs transmission from a plurality of base stations to the terminal, according to the terminal positional information (S115). For example, the control station 100 determines whether the terminal is in the cell edge or inside the cell, based on the positional information received from the terminal and referring to the memory 406, determines to communicate with the terminal by the cooperative transmission in a plurality of base stations in a case where the terminal is in the cell edge, and determines to communicate with the terminal by the single transmission in anyone of the plurality of base stations in a case where the terminal is inside the cell. The control station 100 notifies the determination result from the control station 100 to each of the base stations 110 to 112 (S117). FIG. 9(*a*) illustrates an example of a signal format of determination result notification (cooperative process request) from the control station 100 to the base stations 110 to 112.

Each of the base stations 110 to 112 notifies each terminal of the information regarding the association between frequencies and a plurality of base stations including the local base station (S119 and S121). Here, each of the base stations 110 to 112 selects whether to notify each of the terminals 120 and 121 of association information of all bandwidths, or to notify each of the terminals 120 and 121 of association information of partial bandwidth based on the determination result of the control station (S119). For example, in a case of transmitting the partial bandwidth association information, each of the base stations 110 to 112 may notify each terminal of a portion corresponding to the corresponding frequency range in association information, depending on whether to communicate with the terminal by the cooperative transmission or to communicate with the terminal by the single transmission. FIG. 9(*b*) illustrates an example of the signal format of the association information from the base stations 110 to 112 to the terminals 120 and 121. Further, each of the base stations 110 to 112 may notify each terminal of the association information corresponding to an available bandwidth such as an empty bandwidth.

Further, each of the base stations 110 to 112 transmits a reference signal for each bandwidth (S123 and S127). Each of the terminals 120 and 121 estimates propagation channel information with the local base station or propagation channel information with a plurality of base stations for each sub band of the bandwidth, according to the notified association information, by the received reference signal (S125 and S129). Further, each of the terminals 120 and 121 estimates communication quality obtained in each sub band (Channel Quality Indicator (CQI) that is an indicator standardized in LTE). The terminals 120 and 121 feedback the estimated result to the base stations 110 to 112 (S131). FIG. 10(*a*) illustrates an example of a signal format of channel information and communication quality information from the terminals 120 and 121 to the base stations 110 to 112.

The base stations 110 to 112 perform the scheduling with respect to the corresponding terminal only in the local base station in a range of the bandwidth associated with the local base station, according to the association, determine a transmission scheme and transmit signals to the terminals (S133 to 137). On the other hand, according to the association, with respect to the corresponding terminal in a plurality of base stations, each of the base stations 110 to 112 transmits feedback information of the terminals 120 and 121 to the control station 100 (S131), the control station 100 performs the scheduling in a range of the bandwidth associated with the plurality of the base stations, determines the cooperative transmission scheme and forms cooperative transmission signals to transmit the signals to the base station group involved in the cooperative transmission (S139 to 143). For example, the present example shows a case where it is determined that the group of the base stations 110, 111 and 112 are to perform the cooperative transmission to the terminal 121, but the same applies to a case where it is determined that the group of the base stations 110 and 111 are to perform the cooperative transmission to the terminal 121. The base stations 110 to 112 involved in the cooperative transmission perform each transmission process, and simultaneously transmit a signal to the terminal 121 (S145). In addition, FIG. 10(*b*) illustrates an example of a signal format of the scheduling information and the communication scheme information notified from the base stations 110 to 112 to the terminals 120 and 121.

Figure 11:
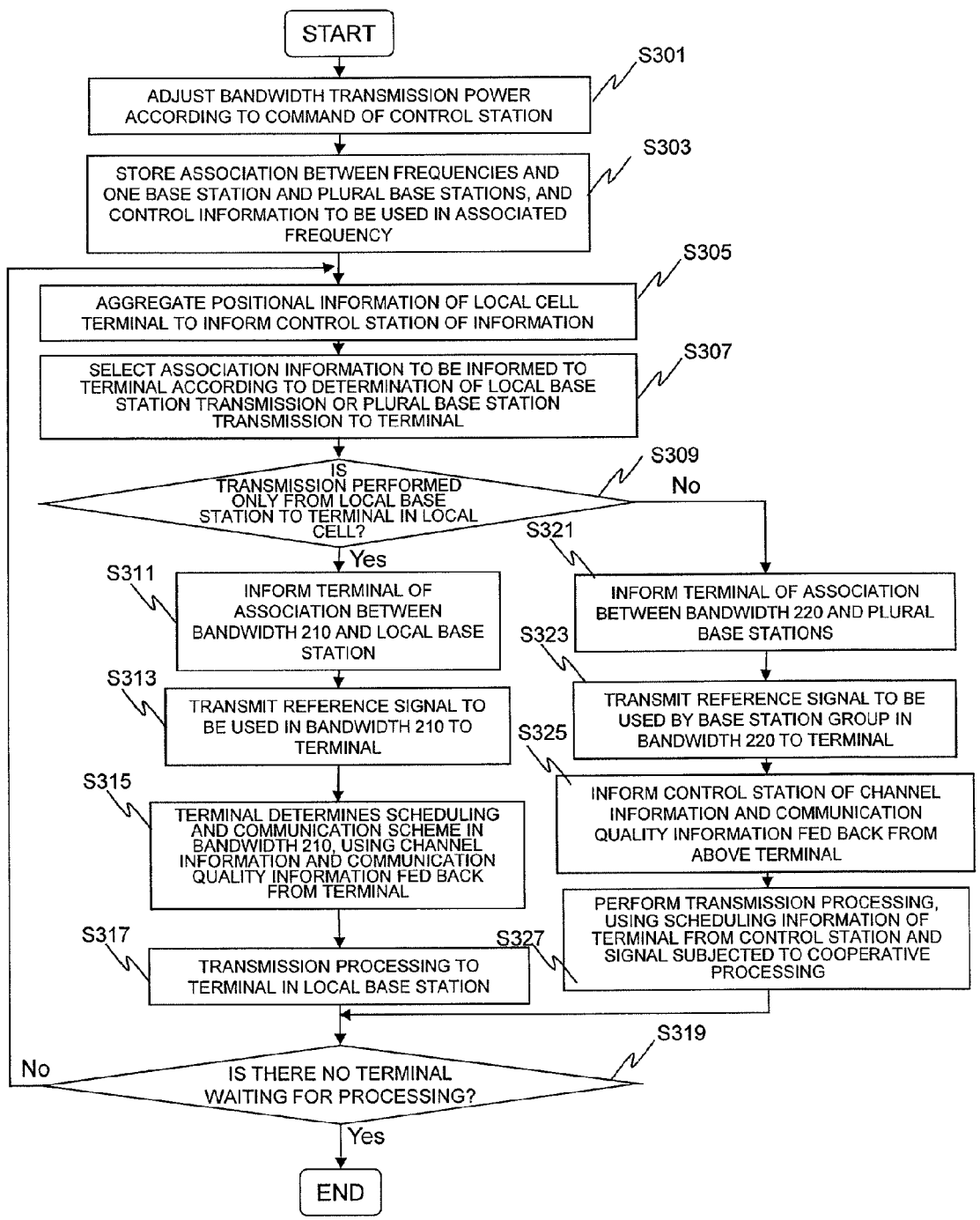
FIG. 11 is a diagram illustrating an operation flow chart of a base station relating to the embodiment of the present invention.

FIG. 11 illustrates an operation flow chart of a base station relating to the embodiment of the present invention.

First, the base stations 110 to 112 (for example, an association processing unit 308 that will be mentioned below, the same process until step S313 and in S321 to S323) adjust the bandwidth transmission power according to the command of the control station 100 (S301). Then, the base stations 110 to 112 store the frequency association with the plurality of the base stations including the local base station and the control information used for the associated frequency (S303). Next, the base stations 110 to 112 aggregate the positional information of the terminal in the local cell and inform the control station 100 of the aggregated information (S305). The base stations 110 to 112 select the association information of which the terminals 120 and 121 are informed, according to the determination of the local base station transmission or the plurality of base station transmission to the terminals 120 and 121 that are determined by the control station 100 (S307). In a case where it is determined that transmission is performed only from the local base station to the terminals 120 and 121 (S309), the base stations 110 to 112 inform the terminals 120 and 121 of the association between the bandwidth 210 and the local base station (S311) and transmit a reference signal used in the bandwidth 210 (S313).

The base stations 110 to 112 (for example, a data transmission and reception controller 305, hereinafter, the same process in S317, S325, and S327), using the channel information and the communication quality information that are fed back from the terminals 120 and 121, perform the scheduling of the terminal in the bandwidth 210, determine a communication scheme (S315), and perform a transmission process to the terminal (S317). Thereafter, if there is a terminal waiting for a process, the process after step S305 is repeated (S319).

On the other hand, in a case where it is determined that transmission is performed from a plurality of base stations to the terminals (S309), the base stations 110 to 112 inform the terminals 120 and 121 of the association between the bandwidth 220 and a plurality of base stations (S321), and transmit the reference signal used for the bandwidth 220 (S323). The channel information and the communication quality information that are fed back from the terminals 120 and 121 are reported to the control station (S325). Then, if the base stations 110 to 112 are involved in the cooperative transmission to the terminals 120 and 121, the transmission process of the base station is performed using the scheduling information of the terminal from the control station 100 and using the signals subjected to the cooperative processing in the control station (S327). Thereafter, the process proceeds to step S319.

Figure 12:
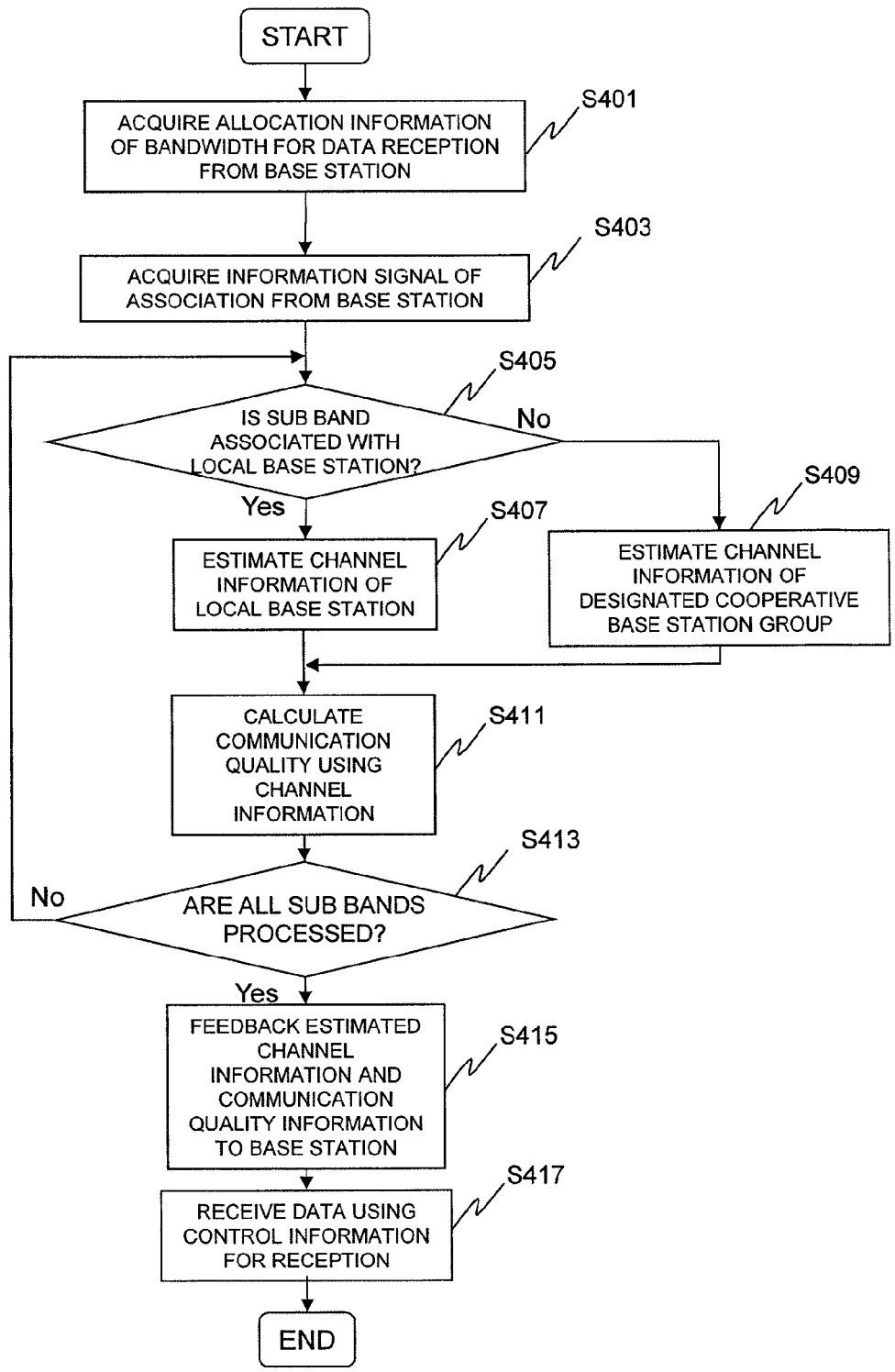
FIG. 12 is a diagram illustrating an operation flow chart of a terminal relating to the embodiment of the present invention.

FIG. 12 illustrates an operation flowchart of a terminal relating to the embodiment of the present invention.

First, the terminals 120 and 121 acquire the allocation information of the bandwidth for data reception from the base station in the local cell (S401). The terminals 120 and 121 acquire an informing signal from the base station (S403). By this informing signal, the terminals 120 and 121 acquire information indicating which base station or which base station group each sub band in the bandwidth used by the terminal corresponds to. According to the association relationship, the terminals 120 and 121 perform a channel information estimation of the local-cell base station or a channel information estimation of each base station out of the designated base station group (S405 to S409). Further, the terminals 120 and 121 calculate the communication quality using the estimated channel information (S411), and feedback the calculation result of each sub band to the base stations 110 to 112 (S415).

The base stations 110 to 112 determine a transmission process scheme based on the result, and transmit transmission data and control information for receiving the data to the terminals 120 and 121. The terminals 120 and 121 perform a reception process of data using control information for reception (S417).

In addition, the terminals 120 and 121 may specify the corresponding frequency range in response to whether to communicate from the base station in the cooperative transmission or in the single transmission, based on the association information received from the base stations 110 to 112, and may perform channel estimation and communication quality estimation in the frequency range. In this case, either one of the aforementioned steps S407 and S409 may be skipped.

Figure 13:
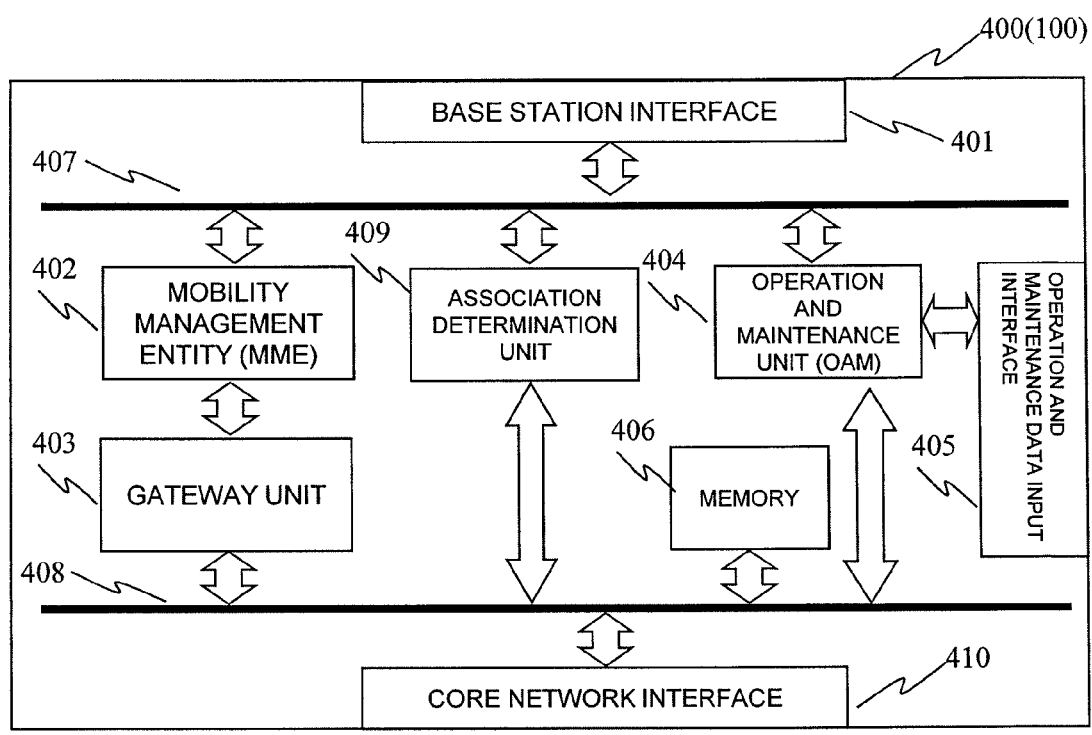
FIG. 13 is a diagram illustrating a device configuration of a control station relating to the embodiment of the present invention.
Figure 14:
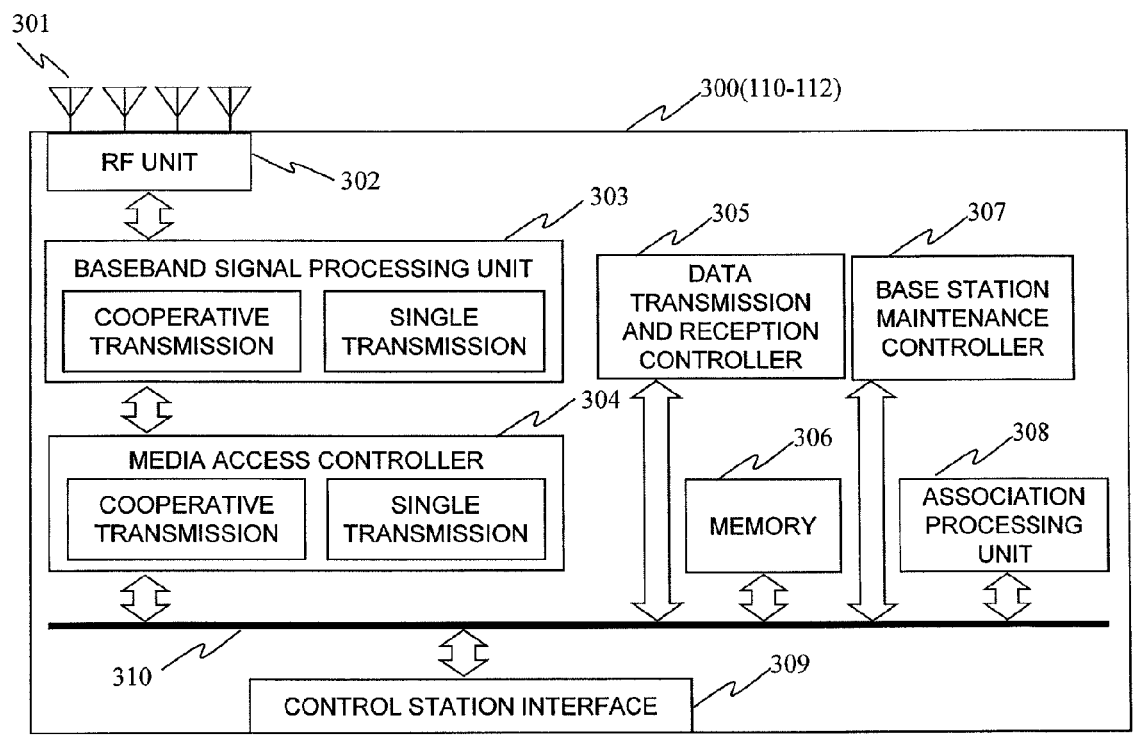
FIG. 14 is a diagram illustrating a device configuration of a base station relating to the embodiment of the present invention.

Each function of the present embodiment described above may be realized by a configuration that is built in the base station and the terminal, that is, hardware such as a Central Processing Unit (CPU), a Digital Signal Processor (DSP), or Field Programmable Gate Array (FPGA). Hereinafter, a specific configuration of each device will be described by drawings. FIG. 12 is a drawing illustrating a specific configuration of a control station, FIG. 13 is a drawing illustrating a specific configuration of a base station device, and FIG. 14 is a drawing illustrating a specific configuration of a terminal device. It is needless to say that these devices can be realized by hardware such as the CPU, the DSP, the FPGA and memory as described above.

FIG. 13 illustrates a configuration diagram of the base station. The control station 400 (aforementioned control station 100) includes a base station interface 401, a mobility management entity 402, a gateway unit 403, an operation and maintenance unit 404, an operation and maintenance data input interface 405, a memory 406, internal buses 407 and 408, an association determination unit 409, and a core network interface 410. The control station 400 is connected to the base station through the interface 401. Then, the interface 401 is connected to the internal bus 407 of the control station. The mobility management entity (MME) 402, the operation and maintenance unit (OAM) 404, and the association determination unit 409 are connected to the internal bus 407. Operation and maintenance data is input from the operation and maintenance data input interface 405, and processed in the operation and maintenance unit 404. According to the processing result, command is transmitted to each base station connected through the base station interface 401. The association between frequencies and one base station or a plurality of base stations is determined in the association determination unit 409 using the processing result and stored in the memory 406. Further, identification information of the reception location and information indicating the cell edge or inside the cell are associated by the operation and maintenance data and stored in the memory 406. On the other hand, signals involved in wireless services are processed in the mobility management entity 402 and the gateway unit 403. For example, the mobility management entity 402 and the gateway unit 403 perform processes including the scheduling in a range of a bandwidth associated with the plurality of base stations, determination of cooperative transmission scheme, formation of cooperative transmission signals and transmission of the signals to an involved base station group. Further, the mobility management entity 402 and the gateway unit 403 are connected to the internal bus 408, and access the core network through the core network interface 410.

FIG. 14 illustrates a configuration diagram of a base station.

The base station 300 (corresponding to the aforementioned base stations 110 to 112) includes an antenna 301, a RF (Radio Frequency) unit 302, a baseband signal processing unit 303, a media access controller 304, a data transmission and reception controller 305, a memory 306, a base station maintenance controller 307, an association processing unit 308, a control station interface 309, and an internal bus 310. In the base station 300, the internal bus 310 is connected to the control station through the control station interface 309. The control station interface 309 is an interface such that the base station is connected to the control station. To the internal bus 310, the media access controller (MAC), the data transmission and reception controller 305, the memory 306, and the base station maintenance controller 307 are connected. According to the maintenance command from the control station 400, wireless parameters are set by a base station maintenance controller 307.

The base station 300 stores the association information notified from the control station 400 and the involved control information in the memory 306, and creates association information in each bandwidth to be transmitted to the terminal and a reference signal used in each bandwidth, in the association processing unit 308 according to the association information and the involved control information. The transmission data from the control station 400 and the information to control the transmission data are once stored in the memory 306, a signal processing is performed in the baseband signal processing unit 303 according to the command of the media access controller 304 and the data transmission and reception controller 305, and the signal is transmitted by the RF unit 302, using the antenna 301.

The baseband signal processing unit 303 and the media access controller 304 respectively perform a process for the cooperative transmission and a process for the single transmission (may be referred to as a cooperative transmission unit and a single transmission unit). Further, in the baseband signal processing unit 303 and the media access controller 304, the transmission functional block may be referred to as a transmission unit, and the reception functional block may be referred to as a reception unit.

On the other hand, signals received from the antenna 301 are converted into baseband signals by the RF unit 302, and the reception process is performed on the signals in the baseband signal processing unit 303 according to the command of the media access controller 304 and the data transmission and reception controller 305. The processing-completed data is once stored in the memory 306 and output to the control station 400. The media access controller 304 has a function to perform an access control on the signals and to output the signals to the baseband processing unit 303. The baseband processing unit 303 has a function to perform a transmission process on the signals according to the command of the baseband transmission and reception controller 305 and to output transmission baseband signals to the RF unit 302, and a function to perform a process on the reception baseband signals input from the RF unit 302 and to output the processed signals to the media access controller 304. The RF unit 302 has a function to up-convert transmission baseband signals input from the baseband signal processing unit 303 to the carrier frequency and to output the up-converted signals to the antenna 301, and a function to down-convert high frequency signals received from the antenna 301 and to output the down-converted signals as reception baseband signals to the baseband signal processing unit 303. The antenna 301 has a function to radiate high frequency signals input from a RF unit 302 in space, and a function to receive signals propagated through space to output the signals to the RF unit 302.

Figure 15:
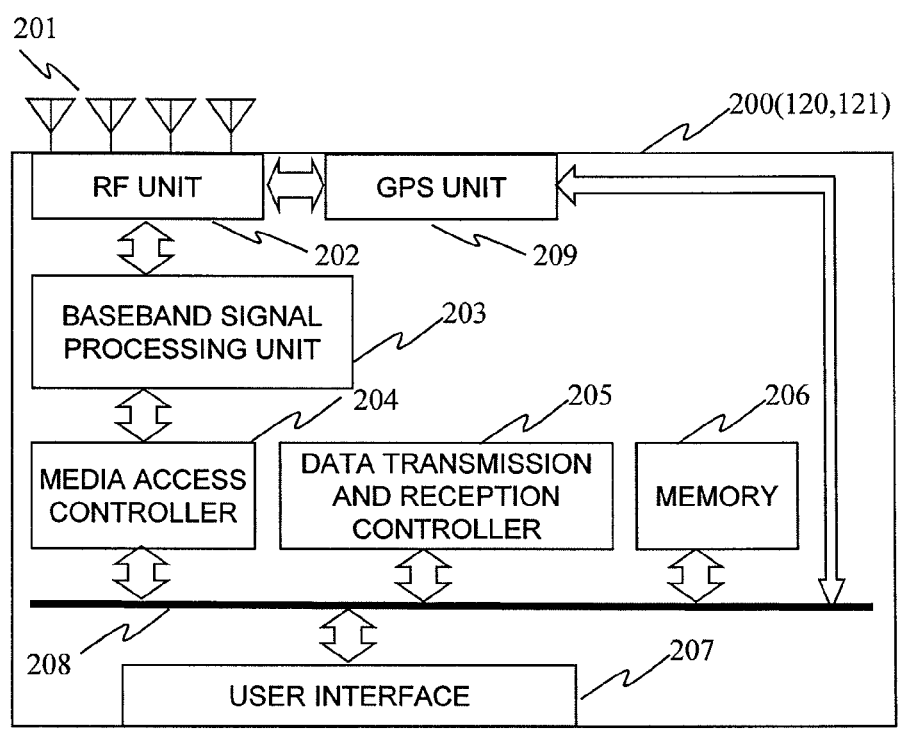
FIG. 15 is a diagram illustrating a device configuration of a terminal relating to the embodiment of the present invention.

FIG. 15 illustrates a configuration diagram of a terminal.

The terminal 200 (corresponding to the aforementioned terminals 120 and 121) includes an antenna 201, a RF unit 202, a baseband signal processing unit 203, a media access controller 204, a data transmission and reception controller 205, a memory 206, a user interface 207, an internal bus 208, and a GPS unit. The operation contents of the antenna 201, the RF unit 202, the baseband signal processing unit 203, the media access controller 204, the data transmission and reception controller 205, and the memory 206 are the same as the operation contents of the aforementioned base station, so here, the detailed description thereof will be omitted, but the media access controller 204 processes signals according to the control information from the base station. Further, the baseband signal processing unit 203 performs channel estimation and reception quality estimation. Similar to the base station, the data subjected to a reception process in the media access controller 204, the baseband signal processing unit 203, and the RF unit 202 is stored in the memory 206, and output by the control of the data transmission and reception controller 206 through the user interface 207. Furthermore, the GPS signal received in the antenna 201 is processed in the GPS unit, and thus the location position of the terminal 200 is known. The information is transmitted to the base station by the internal bus, as a transmission signal, similar to other transmission data.

According to the present embodiment, frequencies and transmission base station combinations are associated, the terminal is notified of the association, and thus the terminal does not have to calculate all available base station combinations with respect to all frequencies and communication quality in each combination, but calculates the only communication quality for each frequency according to the association, thereby it is possible to lighten the processing load of the terminal side. Particularly, the more base stations that cooperate in broad bandwidth, the larger effect of lightening the processing load. Therefore, by applying the inter-base station cooperation transmission to the terminal in the cell edge, it is possible to solve the problem of control divergence that causes the effect on the terminal of the cell center to occur. It is possible to realize the inter-base station cooperative transmission with a small processing amount and the convergence control, and a system having high communication quality of the cell edge.

Further, with respect to selection of a communication scheme according to one base station transmission and the inter-base station cooperative transmission, for example, such as a modulation scheme and a spatial multiplexing scheme, the terminal side does not have to calculate entire communication quality, but measures communication quality according to the notified association pattern, and thereby it is possible significantly reduce a calculation time necessary for selecting each communication scheme. In addition, the base station side does not consider all possibilities with respect to all terminals, but can process by classifying terminals into groups by the association. Therefore, it is possible to determine a communication scheme in a short control period, thereby improving the compliance with the channel change and suppressing performance degradation.

Furthermore, according to the present embodiment, all base stations use the transmission power pattern common in frequencies and base station combinations, and thereby it is possible to perform flexible cell design and base station installation. For example, even in a case where additional base stations are installed in some area and thus new cells are established among the existing cells, the modification in design of all cells and the frequency range allocation are not necessary, and thereby it is sufficient for the newly installed base stations to perform the association between the existing common frequencies and the base stations. Here, the disclosed technique is different from FFR technique. In FFR, the frequency range allocated in the terminal located in the cell edge of each cell changes depending on the relationship with the adjacent cell, and thus it is difficult to flexibly design cells. That is, in a case where a base station is newly established, modification in the designs of all cells may occur in series such that new frequency range is allocated to the cells adjacent to the new cell that the new base station covers. According to the present embodiment, it is possible to improve the degree of freedom in the cell design, and contribute to the increase in the area in which the base stations can be installed and to the efficiency of installation of base stations.

Further, according to the present embodiment, in addition to the system in which a plurality of base stations cooperate to use the cooperative transmission, even in the distributed antenna system in which a plurality of remote radio heads (RRHs) or antennas are pulled out from the base station and distributed in a service area, the base station to which a plurality of RRHs/antennas are connected sets the association between frequencies and RRH combinations, and thus it is possible to lighten the processing load of the terminal control.

Further, it is possible to provide an inter-base station cooperation system with a small processing amount and a high degree of freedom, by setting and informing of the association between frequencies and a plurality of base stations including the local station.

Example 2

The present embodiment can be applied without using positional information of a terminal. As a second embodiment, FIGS. 16 to 17 describe a case where the positional information of the terminal is not used.

Figure 16:
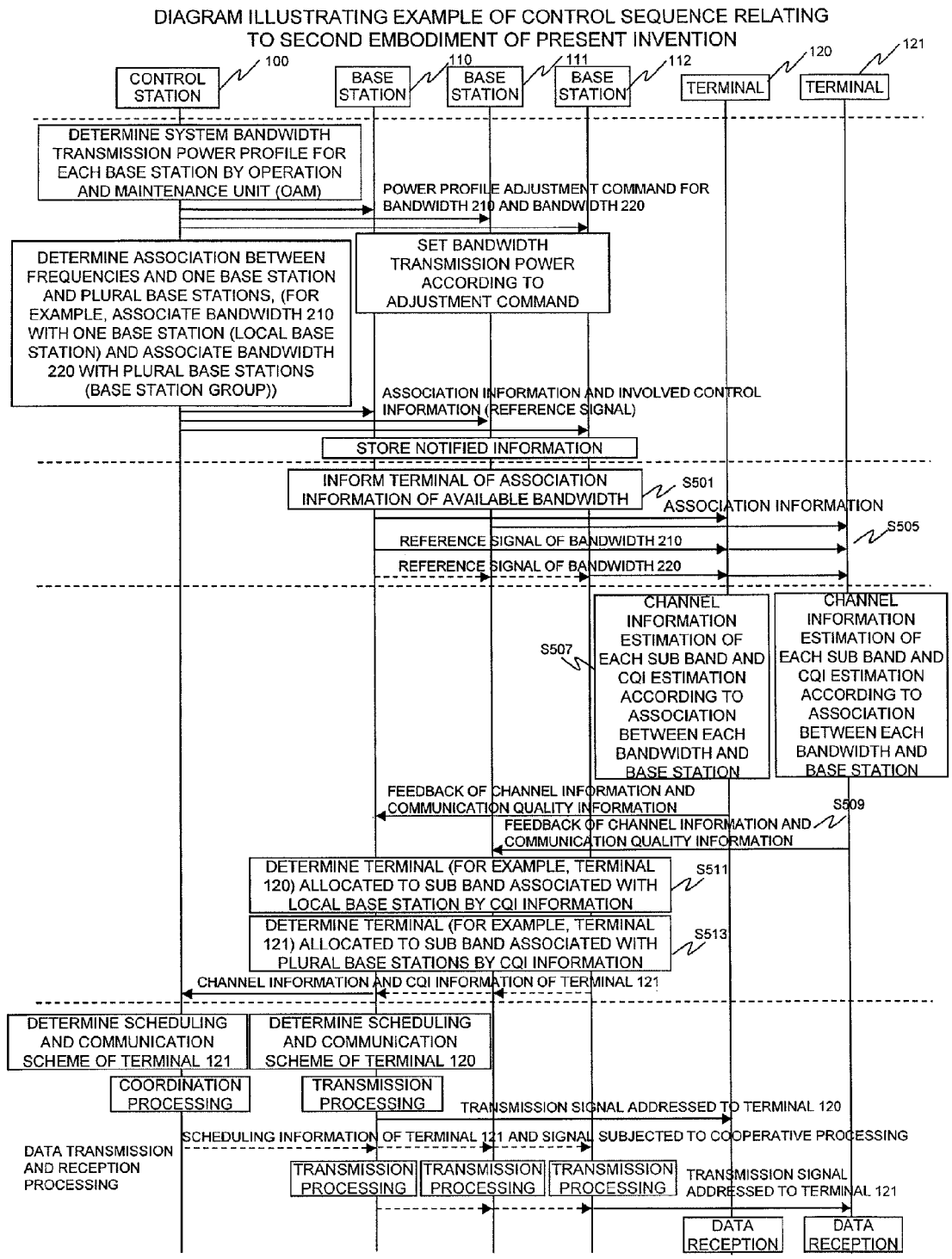
FIG. 16 is a diagram illustrating an example of a control sequence relating to a second embodiment of the present invention.

FIG. 16 illustrates an example of a control sequence of a case without using the positional information of the terminal. Similar to the embodiment 1, first, the control station 100 determines the association between frequencies and one base station and a plurality of base stations, notifies each of the base stations 110 to 112 of the association information and the control information (reference signal) involved in the association, and thus each of the base stations 110 to 112 stores the notified information.

Thereafter, each of the base stations 110 to 112 notifies the terminals 120 and 121 of the association information in the available bandwidth (S501). The available bandwidth is, for example, the bandwidth that is allocated in advance to communication carriers or the bandwidth other than the bandwidth currently in use. In bandwidth information that is received from the control station 100 and stored, the terminal is notified of only association information involved in the available bandwidth. Further, each of the base stations 110 to 112 transmits a reference signal for each bandwidth (S505).

Each of the terminals 120 and 121 estimates propagation channel information with the local base station, or propagation channel information with a plurality of base stations, by the received reference signal, according to the association information that is involved in and notified to each bandwidth (S507). Further, the terminals 120 and 121 estimate communication quality obtained in each sub band. The terminals 120 and 121 feedback the estimated result to the local base stations 110 to 112 (S509). The base stations 110 to 112 compare communication quality obtained in each bandwidth using the information fed back from the terminals 120 and 121, and determine the sub band to be allocated to the terminals 120 and 121 (S511 and S513).

According to the association information, in a case where allocation to the sub band of the bandwidth 210 associated with one base station is performed, the base station determines the scheduling and the communication scheme of the terminal, and processes data transmission to the terminal and performs transmission. On the other hand, in a case where allocation to the sub band of the bandwidth 220 associated with a plurality of base stations is performed, the base station informs the control station 100 of channel information and communication quality information of the sub band of the terminal. The control station 100 determines the scheduling and the cooperative transmission scheme of the terminal using the association information of a plurality of base stations and the bandwidth. Further, the control station forms cooperative transmission signals and transmits the scheduling information and the coordination signal to the base station group involved in the cooperative transmission. For example, in the present embodiment, the group of the base stations 110, 111 and 112 determines cooperative transmission to the terminal 121, but the group of the base station 110 and the base station 111 may determine cooperative transmission to the terminal 121. The base station involved in the cooperative transmission performs transmission process using the scheduling information and the coordination signals from the control station and transmits the signals to the terminal 121.

Figure 17:
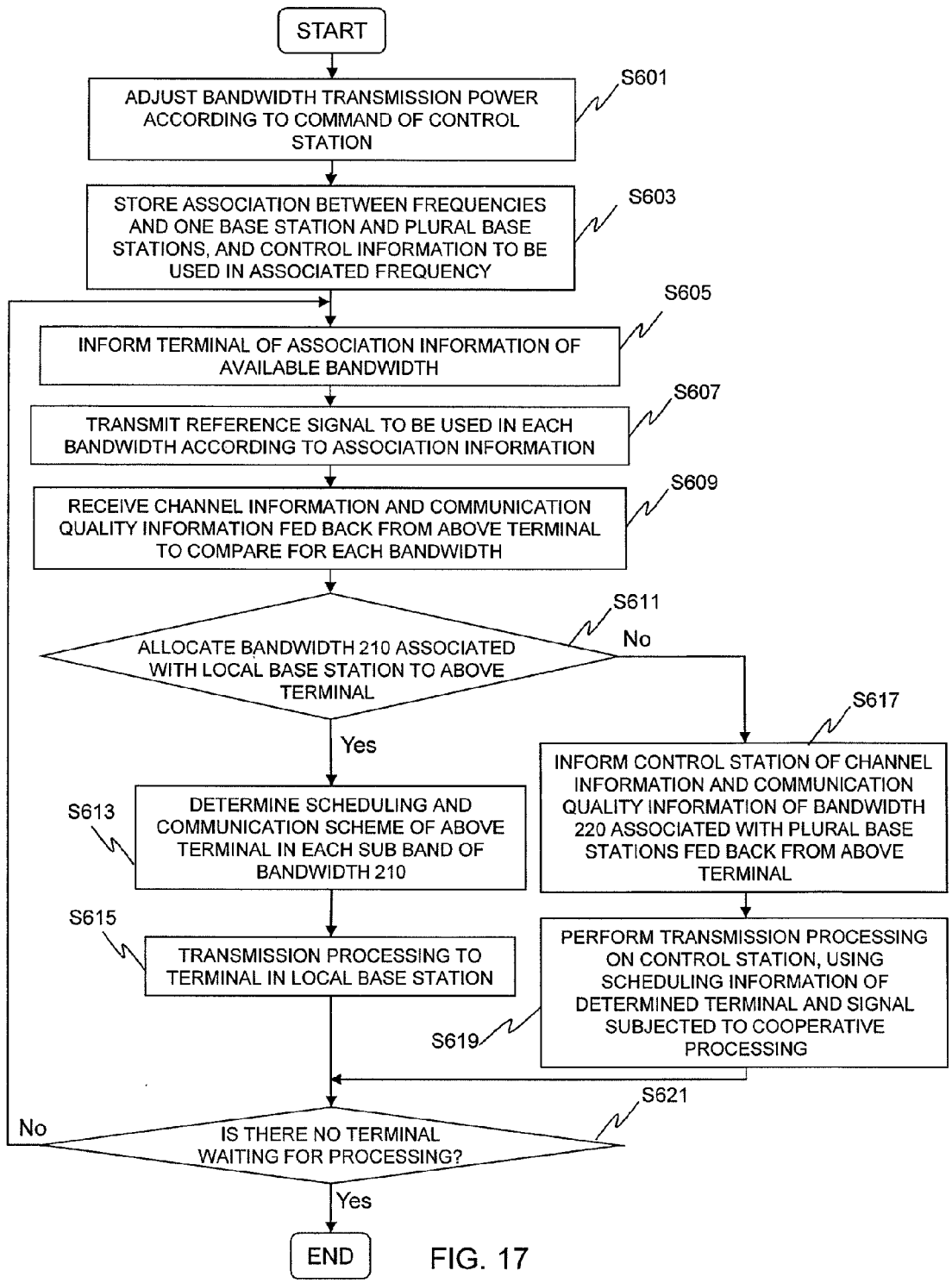
FIG. 17 is a diagram illustrating an operation flow chart of a base station relating to the second embodiment of the present invention.

FIG. 17 illustrates an operation flow chart of a base station relating to the second embodiment.

First, similar to the first embodiment, the base stations 110 to 112 adjust bandwidth transmission power according to a command of the control station 100 (S601). Then, the base stations 110 to 112 store frequency association with the plurality of base stations including local base station and control information used in the associated frequency (S603). Next, the base stations 110 to 112 inform the terminal of association information of the bandwidth that can be used by the base station because the positional information of the terminal is not used (S605). Further, the base stations 110 to 112 transmit the reference signal to be used for each bandwidth to the terminal, according to the association information (S607). The base stations 110 to 112 receive and compare channel information and communication quality information of each sub band that are fed back from the terminal (S609). In a case of allocating to the terminal, sub bands of the bandwidth 210 that are associated with the local base station, depending on the comparison result (S611), the base stations 110 to 112 determine the scheduling and the communication scheme of the terminal in the local base station (S613), perform transmission process of data and transmit the data to the terminal (S615). The terminal waiting for process repeats the aforementioned process after step S605.

On the other hand, in a case of allocating to the terminal, sub bands of the bandwidth 220 that are associated with a plurality of base stations, the base stations 110 to 112 inform the control station 100 of channel information of the bandwidth 220 that is feed back from the terminals 120 and 121 and communication quality information (S617). Thereafter, the base stations 110 to 112 perform transmission process of the base stations to transmit to the terminal, using the scheduling information of the terminal determined in the control station 100 and the cooperative transmission signal (S619). Thereafter, the process proceeds to step S621.

According to the present embodiment, in the estimation of the channel information and the communication quality information of each sub band, each terminal does not have to calculate various combinations of a plurality of base stations including the local base station and communication schemes, but estimates the channel information and the communication quality information on the assumption of the transmitting base station/the base station group in each sub-band, with respect to the available bandwidth, according to the association information of the notified base station and the sub band. Further, the base station can arrange the information fed back to the terminal by the association information, and determine the single process in the local base station and the cooperative process in the plurality of base stations without affecting each other. Therefore, it is possible to make the feedback information of the terminal more efficient and lighten the processing load of the process in which the base station determines the scheduling and the communication scheme, compared to the system in the related art.

Configuration Example

A wireless communication system includes, for example, a base station, a control station, and a terminal,
each base station includes,
an inter-base station cooperative transmission unit that performs cooperative transmission with the plurality of base stations,
an association setting unit that performs an association between frequencies and the plurality of base stations including local station, and
an association informing unit that informs the terminal of the association,
the terminal includes,
a channel estimation unit that measures channel information for each frequency, according to the association information,
a communication quality calculation unit that calculates communication quality for each frequency using the association information and a channel estimation result, and
a unit that notifies the base station of the channel estimation result and communication quality calculation,
the base station includes,
a unit that determines communication scheme with a terminal using notification result of the terminal, and
a unit that informs the control station of the result.

In the aforementioned wireless communication system, it is one of features that the base station selects whether to notify a terminal of all of or a part of the associations.

In the aforementioned wireless communication system, it is one of features that the association is either a combination of a frequency and one base station or a combination of a frequency and a plurality of base stations.

In the aforementioned wireless communication system, it is one of features that the channel is an environment of a propagation channel from one base station that is associated or an environment of a propagation channel in a case where a plurality of base stations that are associated perform cooperation communication by simultaneous communication.

In the aforementioned wireless communication system, it is one of features that the base station selects a communication scheme with a terminal based on a measurement result of a terminal according to a corresponding relationship for each frequency.

In the aforementioned wireless communication system, it is one of features that the control station includes,
an information input unit that inputs reception strength data of an area that a radio wave of the base station covers, and
an operation and maintenance unit that adjusts a transmission power profile of each base station using the information.

In the aforementioned wireless communication system, it is one of features that the association can be common in all base stations.

INDUSTRIAL APPLICABILITY

The present invention can be used in, for example, a wireless system using inter-base station cooperative transmission.

REFERENCE SIGNS LIST

100 . . . control station
110, 111 . . . base station
120, 121 . . . terminal
210, 220 . . . frequency range
201 . . . antenna of terminal device
202 . . . RF (high frequency) unit of terminal device
203 . . . baseband signal processing unit of terminal device
204 . . . media access controller of terminal device
205 . . . data transmission and reception controller of terminal device
206 . . . memory of terminal device
207 . . . user interface of terminal device
208 . . . internal bus of terminal device
209 . . . GPS unit of terminal device
301 . . . antenna of base station device
302 . . . RF (high frequency) of base station device
303 . . . baseband signal processing unit of base station device
304 . . . media access controller of base station device
305 . . . data transmission and reception controller of base station device
306 . . . memory of base station device
307 . . . base station maintenance controller of base station device
308 . . . control station interface of base station device
309 . . . internal bus of terminal device
401 . . . base station interface of control station device
402 . . . mobility management entity of control station device
403 . . . gateway unit of control station device
404 . . . operation and maintenance unit (OAM) of control station device
405 . . . operation and maintenance data input interface of control station device
406 . . . core network interface of control station device
407, 408 . . . internal bus of control station device

The invention claimed is:

1. A wireless communication system comprising:
a plurality of base stations;
a terminal that wirelessly communicates with a base station based on a result of channel estimation and communication quality estimation with the base station; and
a control station that determines association information in which a first frequency range used in a cooperative transmission by the plurality of base stations and a second frequency range used in single transmission by one base station are specified, and notifies the plurality of base stations of the association information, wherein
the base station includes:
a transmission unit that performs the cooperative transmission to the terminal by the plurality of base stations and performs single transmission to the terminal from a local base station; and
an association processing unit that notifies the terminal of the association information notified from the control station, the terminal specifies a corresponding frequency range, according to whether to perform communication with the base station by the cooperative transmission from the base station or to perform communication with the base station by single transmission from the base station, based on the association information received from the base station, and performs channel estimation and communication quality estimation in the frequency range, wherein
the control station determines whether the terminal is in a cell edge or inside a cell based on positional information of the terminal,
determines to communicate with the terminal by the cooperative transmission from the plurality of base stations, in a case where the terminal is in the cell edge, and
determines to communicate with the terminal by single transmission with any one of the base stations, in a case where the terminal is inside the cell.

2. The wireless communication system according to claim 1, wherein
the terminal notifies the base station and/or the control station of the estimated channel information and communication quality information, and
the base station or the control station determines communication scheduling and communication scheme with the terminal using the notified result.

3. The wireless communication system according to claim 1, wherein
the control station includes a memory which stores in advance information indicating whether position is the cell edge or inside the cell, corresponding to positional information within the cell, and
the terminal transmits the positional information of a local terminal to the control station through the base station.

4. The wireless communication system according to claim 3, wherein the control station includes:
a data input unit that inputs positional information of the position, that is measured in any position inside an area that the base station covers, and reception strength data from each base station in the position;
an operation and maintenance unit that determines whether the position is a cell edge or a cell center based on the input reception strength data from each base station, and stores information indicating whether the position is the cell edge or inside the cell, corresponding to the input positional information, in the memory; and
an association determination unit that determines association information in which the first frequency range used in the cooperative transmission by the plurality of base stations and the second frequency range used in the single transmission by one of the base stations are specified.

5. The wireless communication system according to claim 1, wherein the base station selects either one of notifying the terminal of all association information or notifying the terminal of a portion corresponding to the corresponding frequency range, according to whether to communicate with the terminal by the cooperative transmission or to communicate by the single transmission, in association information, and notifies the terminal of an entire or a part of the association information.

6. The wireless communication system according to claim 1, wherein the channel estimated in the terminal is either one of an environment of a propagation channel from one associated base station or an environment of a propagation channel in a case where an associated plurality of base stations perform the cooperation communication.

7. The wireless communication system according to claim 1, wherein
the control station transmits power profile information including an association between the first frequency range and first transmission power of the base station in the cooperative transmission and an association between the second frequency range and second transmission power of the base station in the single transmission, to the base station, and
the base station sets transmission power in each frequency range according to received power profile information,
wherein the second transmission power in the single transmission is set to be smaller than the first transmission power in the cooperative transmission.

8. The wireless communication system according to claim 7, wherein the control station includes,
a data input unit that inputs positional information of the position, that is measured in any position inside an area that the base station covers, and strength data received from each base station in the position;
an operation and maintenance unit that reduces a second transmission power of a desired base station in a case where reception strength data of the second frequency range from the desired base station is larger than a predetermined threshold value, in a position of the cell edge, based on reception strength data that is input in the data input unit, and creates power profile information based on predetermined first transmission power and the reduced second transmission power; and
an association determination unit that determines association information in which the first frequency range used in the cooperative transmission by the plurality of base stations and the second frequency range used in the single transmission by the one base station are specified.

9. The wireless communication system according to claim 1, wherein the association information is commonly used by all base stations within the system.

10. The wireless communication system according to claim 1, wherein the base station transmits association information of available bandwidths at least other than a bandwidth in which allocation is completed, to the terminal.

11. The wireless communication system according to claim 1, wherein the association information is notified in a bit map format indicating whether a value of each bit is for the cooperative transmission or for the single transmission, each bit corresponding to a frequency or a sub band.

12. The wireless communication system according to claim 1, wherein the control station dynamically changes an allocation amount of the first frequency range used in the cooperative transmission and an allocation amount of the second frequency range used in the single transmission.

13. A base station in a wireless communication system which includes a plurality of base stations, a terminal that wirelessly communicates with a base station based on a result of channel estimation and communication quality estimation with the base station, and a control station, the base station comprising:
a transmission unit that performs a cooperative transmission to the terminal by the plurality of base stations and a single transmission from a local base station to the terminal; and
an association processing unit that receives from the control station, association information in which a first frequency range used in the cooperative transmission by the plurality of base stations and a second frequency range used in the single transmission by one of the base stations are specified, and notifies the terminal of the association information;

wherein the base station receives result of channel estimation and communication quality estimation performed in a corresponding frequency range, according to whether the terminal communicates with the base station by the cooperative transmission from the plurality of base stations or to communicate with the base station by the single transmission from the base station, based on the association information, and the base station determines a communication scheduling and a communication scheme with the terminal using the result of the channel estimation and the communication quality estimation, or receives a communication scheduling and a communication scheme with the terminal determined by the control station using the result of the channel estimation and the communication quality estimation, and communicates with the terminal by the scheduling and the communication scheme, and the control station determines whether the terminal is in the cell edge or inside the cell, referring to the memory, based on the positional information received from the terminal, determines to communicate with the terminal by the cooperative transmission from the plurality of base stations, in a case where the terminal is in the cell edge, and determines to communicate with the terminal by single transmission with any one of the base stations, in a case where the terminal is inside the cell.

14. The base station according to claim 13, wherein the base station selects either one of notifying the terminal of all association information or notifying the terminal of a portion corresponding to the corresponding frequency range, according to whether to communicate with the terminal by the cooperative transmission or to communicate by the single transmission, in association information, and notifies the terminal of an entire or a part of the association information.

15. The base station according to claim 13, wherein the base station transmits association information of available bandwidths at least other than a bandwidth in which allocation is completed, to the terminal.

16. The base station according to claim 13, wherein the association information is notified in a bit map format indicating whether a value of each bit is for the cooperative transmission or for the single transmission, each bit corresponding to a frequency or a sub band.

17. A wireless communication method in a wireless communication system which includes a plurality of base stations, a terminal that wirelessly communicates with a base station based on a result of channel estimation and communication quality estimation with the base station, and a control station, the wireless communication method including steps of:

the control station determining association information in which a first frequency range used in a cooperative transmission by the plurality of base stations and a second frequency range used in a single transmission by one of the plurality of base stations are specified, and notifying the plurality of base stations of the association information;

each base station notifying the terminal of association information which is notified from the control station; and the terminal specifying a corresponding frequency range, according to whether the terminal communicates with the base station by the cooperative transmission from the base stations or to communicate with the base station by the single transmission from the base station, based on the association information received from the base station, and performing channel estimation and communication quality estimation in the frequency range, and the control station determines whether the terminal is in the cell edge or inside the cell, referring to the memory, based on the positional information received from the terminal, and determines to communicate with the terminal by the cooperative transmission from the plurality of base stations, in a case where the terminal is in the cell edge, and determines to communicate with the terminal by single transmission with any one of the base stations, in a case where the terminal is inside the cell.

* * * * *